UNITED STATES PATENT OFFICE.

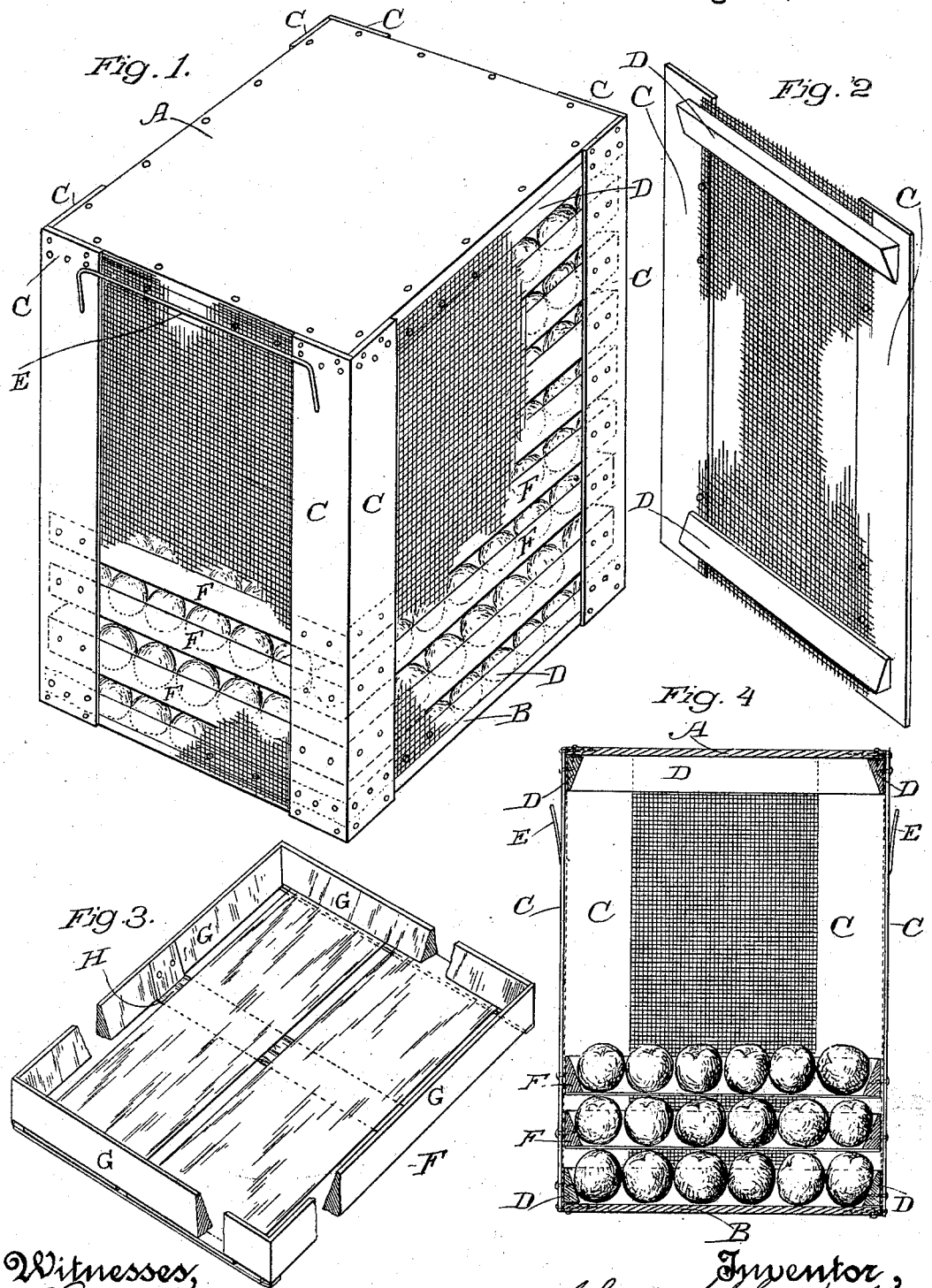

CHARLES S. CHAMBERLAIN, OF OAKLAND, CALIFORNIA.

FRUIT-CRATE.

SPECIFICATION forming part of Letters Patent No. 544,881, dated August 20, 1895.

Application filed December 26, 1894. Serial No. 532,972. (No model.)

*To all whom it may concern:*

Be it known that I, CHARLES S. CHAMBERLAIN, a citizen of the United States, residing in Oakland, county of Alameda, State of California, have invented an Improvement in Fruit-Crates; and I hereby declare the following to be a full, clear, and exact description of the same.

My invention relates to improvements in boxes or crates for the transportation of fruit.

It consists in certain details of construction, which will be more fully explained by reference to the accompanying drawings, in which—

Figure 1 is a perspective view of my crate, the screen being broken away to show the trays. Fig. 2 is a perspective view of one of the sides of the crate. Fig. 3 is a perspective view of one of the trays, the sides being broken. Fig. 4 is a vertical section.

The object of my invention is to provide a crate for the transportation of fruit in such a manner that the fruit will be perfectly ventilated and will not be bruised by any handling that the crate may undergo.

In the construction of my improved fruit-crate I have shown the top and bottom made tight and the sides and ends made with ventilating-openings covered with wire screen or otherwise closed to prevent the removal of the fruit, while allowing a free access of air.

A and B are the top and bottom of the box, and C C are the sides. These sides are shown in the present case as formed of strips extending vertically between the top and bottom upon each side of the corners thereof, and they are secured to the top and bottom by means of triangularly-shaped strips D, to which the top and bottom and the ends of the side strips are also nailed, thus making a strong and rigid construction.

In the manufacture of the box the vertical side strips are nailed to the transverse strips D, so that the ends of the strips C project enough beyond the strips D to form a shoulder or abutment, against which the top and bottom fit when nailed to the sides. The space intervening between the vertical side strips is covered by wire-gauze or screen material. This material is nailed along the inside of the strips C, the latter lying parallel and separated to the proper distance to fit the top and bottom, and the end strips D are then laid over the screen material which projects a short distance beneath them and are nailed to the side strips, so that when these side and end strips are nailed together and the top and bottom are in place the ends of the screen material lie flush against the ends of the box, while its sides are covered by the vertical side strips. Wire handles E are fixed in the vertical strips C at opposite sides of the box and near the top, so that the box can be easily handled and kept in an upright position. The bevel or triangular strips D preferably extend all around the bottom as well as the top of the box, and the first layer of fruit that is placed in the box may be placed upon this bottom, the inclination of the inner surfaces of the strips D being such that apples, peaches, and similar fruit will rest against the inclined sides and will not touch the upper angles or corners of the strips. The trays F upon which the fruit is placed are made of similar triangular strips G, forming the sides and having a bottom formed of thin strips of material nailed upon their lower edges, with transverse strips extending across the ends of the bottom boards and nailed through them to the triangular pieces. Across the center of the bottom boards is a narrow transverse strip H, to which the bottom boards may be secured, and the ends of this strip are turned up so as to pass between the outer edges of the boards and the sides, these upturned ends being nailed to the sides so as to form a support for the central portion of the bottom boards sufficient to prevent them from sagging. These bottom boards are made in two or more strips, with a sufficient space between them and between them and the sides to allow the circulation of air in conjunction with the openings at the sides of the case.

When the bottom of the crate has been covered with fruit which is regularly placed thereon in a single layer, the first tray is placed upon the fruit, resting lightly thereon, and is secured in place by nailing through the sides of the crate or box, so that the tray will not be movable from that position. This tray is then filled with fruit, and the next one is in like manner secured in place until the crate or box has been filled to the top. The side through which the trays have been introduced is then put in place, this side being constructed of vertical strips C and transverse triangular end pieces D and screen material in the same manner that the other sides are made, and it is nailed to the ends of the triangular strips, forming the two adjacent sides, so that the crate is now complete. By thus fastening the trays in place just above the fruit the latter will be held in place and prevented from shifting its position, even although the crate or box should be temporarily turned upon one side, as the space between each of the trays is only sufficient for the fruit packed, and the different articles cannot move very much with relation to each other. The trays being each nailed firmly to the sides greatly strengthen the structure and enable me to make it of very light material while making it very rigid.

As the sides of each of the trays are made of the beveled or triangular strips G, as before described, it will be manifest that the curved sides of the fruit will rest against these strips at points intermediate between the top and bottom, and the fruit will thus be preserved from indentations or cuts which are liable to occur if the sides of the trays were vertical, so that the curvature of the fruit could rest against the sharp angles at the top, and this is an important feature of the whole construction of my crate.

Crates or boxes thus constructed with independent sides or panels may be made up in quantity, and the sides, tops, and bottoms being completed, ready to put together, can be packed flat for transportation and set up on the arrival at their destination.

Having thus described my invention, what I claim as new, and desire to secure by Letters Patent, is—

1. A fruit box or crate consisting of top and bottom boards, sides composed of vertical strips having transverse triangular strips nailed across their ends to connect them together and at a distance from the ends sufficient to form a space to admit the top and bottom boards of the box which are nailed thereto, wire gauze screen material having its top and bottom nailed to the transverse triangular strips, and the sides extending beneath and nailed to the vertical side strips, and trays composed of side strips and bottom boards, said trays being nailed successively into the box in contact with each layer of fruit which has been placed in the tray below.

2. In fruit boxes having an exterior case, a series of trays each consisting of open center frames whose inner walls are beveled to present an inclined surface to the fruit, bottom boards secured at their ends to the end strips of the frames, and a transverse strip passing beneath the bottom boards and secured at its ends to the side strips of the open frames, said trays being nailed successively into the exterior case in contact with each layer of fruit which has been placed in the tray below, substantially as herein described.

In witness whereof I have hereunto set my hand.

CHARLES S. CHAMBERLAIN.

Witnesses:
S. H. NOURSE,
WM. F. BOOTH.